(12) United States Patent
Arsanjani et al.

(10) Patent No.: US 9,292,821 B2
(45) Date of Patent: *Mar. 22, 2016

(54) SYSTEM AND METHOD FOR TRANSFORMING A COMPONENT BUSINESS MODEL

(71) Applicant: International Business Machines Corporation, Armonk, NY (US)

(72) Inventors: Ali P. Arsanjani, Fairfield, IA (US); Ahamed Jalaldeen, Karnataka (IN); Siddharth N. Purohit, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/036,209

(22) Filed: Sep. 25, 2013

(65) Prior Publication Data

US 2014/0025602 A1      Jan. 23, 2014

Related U.S. Application Data

(63) Continuation of application No. 12/258,892, filed on Oct. 27, 2008, now Pat. No. 8,561,013.

(51) Int. Cl.
*G06F 9/44* (2006.01)
*G06Q 10/06* (2012.01)

(52) U.S. Cl.
CPC ............... *G06Q 10/067* (2013.01); *G06F 8/10* (2013.01)

(58) Field of Classification Search
None
See application file for complete search history.

(56) References Cited

U.S. PATENT DOCUMENTS

| | | | |
|---|---|---|---|
| 2004/0027388 A1* | 2/2004 | Berg et al. | 345/781 |
| 2005/0246215 A1 | 11/2005 | Rackham | |
| 2007/0021993 A1 | 1/2007 | Chandra et al. | |
| 2007/0022410 A1 | 1/2007 | Ban et al. | |
| 2007/0033211 A1 | 2/2007 | Berman et al. | |
| 2007/0038627 A1 | 2/2007 | Cohn et al. | |
| 2007/0118551 A1 | 5/2007 | Akkiraju et al. | |
| 2007/0162482 A1 | 7/2007 | Flaxer et al. | |
| 2007/0174109 A1 | 7/2007 | Cohn et al. | |
| 2007/0271277 A1* | 11/2007 | Ivan et al. | 707/100 |
| 2007/0279416 A1 | 12/2007 | Cobb et al. | |
| 2008/0033888 A1 | 2/2008 | Flaxer et al. | |

OTHER PUBLICATIONS

Vladimir Ergovic, "SOA From a Business Centric Perspective" Presented at the 2nd International Workshop on Service Oriented Software Engineering 2007.*

Iyengar et al. ("Constructing Industry Specific SOA Solutions Using the IBM Rational Software Delivery Platform") 2007.*

(Continued)

*Primary Examiner* — Li B Zhen
*Assistant Examiner* — Lenin Paulino
(74) *Attorney, Agent, or Firm* — George R. McGuire; John Pivnichny; Bond Schoeneck & King, PLLC (57) ABSTRACT

Seamless transition from a Component Business Model (CBM) to a Services Oriented Architecture (SOA) is achieved by converting a tabular representation of a CBM Heat Map to a Unified Modeling Language (UML) representation, and automatically converting the UML representation of a CBM Heat Map to a first iteration of input used during the subsequent SOA solution development using Service Oriented Modeling and Architecture (SOMA).

16 Claims, 5 Drawing Sheets

(56) References Cited

OTHER PUBLICATIONS

Nayak, N., et al., "Core Business Architecture for a Service-Oriented Enterprise," IBM Systems Journal, vol. 46, No. 4, 2007, pp. 723-742.

Iyengar Sridhar, et al., "Constructing Industry Specific SOA Solutions using the IBM Rational Software Delivery Platform," IBM Rational Software Development Conference 2007, Session AD09, 2007, IBM Corporation.

U.S. Appl. No. 12/258,892.

* cited by examiner

| CBM CONCEPT | SOA CONCEPT |
|---|---|
| Business Competency | Domain |
| Business Component | Functional Area |
| Business Service | Function |

SYSTEM AND METHOD FOR TRANSFORMING A COMPONENT BUSINESS MODEL

CROSS-REFERENCE TO RELATED APPLICATIONS

This application is a continuation of U.S. patent application Ser. No. 12/258,892 filed on Oct. 27, 2008 and entitled "System and Method for Transforming a Component Business Model," the entire disclosure of which is incorporated herein by reference.

FIELD OF INVENTION

The present invention relates to a Component Business Model (CBM) and more specifically to the use of CBM Heat Maps in Services Oriented Architecture (SOA) based solution development.

BACKGROUND

Companies have long sought to integrate existing systems in order to implement information technology (IT) support for business processes that cover all present and prospective systems requirements needed to run the business end-to-end. A variety of designs can be used to this end, ranging from rigid point-to-point electronic data interchange (EDI) interactions to Web auctions. By updating older technologies, such as Internet-enabling EDI-based systems, companies can make their IT systems available to internal or external customers; but the resulting systems have not proven to be flexible enough to meet business demands. A flexible, standardized architecture is required to better support the connection of various applications and the sharing of data. Service Oriented Architecture (SOA) (see DEFINITIONS section) is one such architecture. It unifies business processes by structuring large applications as an ad hoc collection of smaller modules called services.

These applications can be used by different groups of people both inside and outside the company, and new applications built from a mix of services from the global SOA pool exhibit greater flexibility and uniformity. In an example using a bank as the business using the SOA architecture, a bank customer would not, for example, have to provide redundantly the same personal information to open an online checking account, and again for a savings, and yet again for an IRA account. This is because the SOA architecture facilitates data transfer, and/or usage of common data, between the three different account opening processes. Furthermore, the interfaces for opening each of the accounts would preferably have the same look and feel and use the same level and type of input data validation. Again, this is facilitated by SOA.

In this way, building all applications from the same SOA pool of services makes the processes: (i) work efficiently from a data standpoint; (ii) work efficiently from a processing standpoint; and (iii) work smoothly from the perspective of customer familiarity and aesthetics. SOA is also more deployable to affiliate companies than other architectures. An example of this, a travel services customer can interact with a rental car company's reservation system from an airline company's reservation system.

Service Oriented Architecture (SOA) is a design framework for realizing rapid and low-cost system development and improving total system quality. SOA preferably uses the Web services standards and technologies and is rapidly becoming a standard approach for enterprise information systems. Web services face significant challenges because of particular requirements. There are many problems that are to be addressed when applying the SOA paradigm to a real-time system, which include response time, support of event-driven, asynchronous parallel applications, complicated human interface support, reliability, etc. As set forth below in the definition of SOA in the DEFINITION section, SOA services communicate with each other. Communication between various SOA services can involve simple data passing, or it can involve two or more services coordinating some activity. Some means of connecting SOA services to each other is generally needed in an SOA system.

SOAs build applications out of software services (see DEFINITIONS section). Because services do not embed calls to each other in their source code, protocols are defined which describe how one or more services can talk to each other. This architecture then relies on a business process expert to link and sequence services, in a process known as orchestration, to meet a new or existing business system requirement.

There were pre-SOA software architectures and/or techniques that promoted some degree of software reuse, specifically: (i) functional software modules and; (ii) predefined groups of functions known as classes. However, these pre SOA software architectures and/or techniques are different than SOA for one or more of the following reasons: (i) they do not use services (see DEFINITIONS section); (ii) the atomic-level objects of an SOA are often 100 to 1,000 times larger; (iii) SOA services are associated by an application designer or engineer using orchestration; and/or (iv) the pre-SOA software architectures and techniques do not otherwise meet the definition of an SOA (see DEFINITIONS section). In the process of orchestration, relatively large chunks of software functionality (services) are associated in a non-hierarchical arrangement (in contrast to a class hierarchy) by a software engineer, or process engineer, using a special software tool which contains an exhaustive list of all of the services, their characteristics, and a means to record the designer's choices which the designer can manage and the software system can consume and use at run-time.

Metadata preferably underlies and enables the SOA. Preferably, the metadata is sufficient to describe not only the characteristics of the SOA services, but also the data that drives them. Extensible markup language (XML) has been used extensively in SOA to create data which is wrapped in a nearly exhaustive description container. Analogously, the services themselves are typically described by web services description language (WSDL), and communications protocols by simple object access protocol (SOAP). Whether these description languages are the best possible for the job, and whether they will remain the favorites going forward, is at present an open question. SOA is preferably dependent on data and services that are described using a type of metadata that will herein be called SOA metadata (see DEFINITIONS section). SOA metadata is metadata in a form so that: (i) software systems can use the SOA metadata to configure themselves dynamically; (ii) software systems can use the SOA metadata to configure themselves by discovery and incorporation of defined services; (iii) coherence is maintained; (iv) integrity is maintained; (v) system designers can understand the SOA metadata at a reasonable cost and effort; and (iv) system designers can manage the SOA metadata at a reasonable cost and effort.

A Component Business Model (CBM) (see DEFINITIONS section) is conventional. For example, US patent application 2005/0246215 ("Rackham") discloses a methodology for building a CBM. It is conventional for a CBM to include a heat map (see DEFINITIONS section). At FIG. 2C of Rackham, Rackham discloses an example of a heat map. The Rackham CBM and associated heat map are not disclosed to be an approach or tooling to consume a CBM Heat Map for SOA solution development.

US patent application 2007/0279416 ("Cobb") discloses a computer program product for enabling and rendering business components of a CBM in an interactive data visualization tool. The Cobb product includes one or more heat maps. The CBM and associated heat map(s) of Cobb are not disclosed to be an approach or tooling to consume a CBM Heat Map for SOA solution development.

US patent application 2007/0021993 ("Chandra") discloses an enterprise architecture that can be viewed through a Component Business Model. In Chandra, a metamodel i integrates the model of the enterprise architecture with the Component Business Model. Chandra does not disclose an approach or tooling to consume a CBM Heat Map for SOA solution development.

US patent application 2007/0033211 ("Berman") discloses a CBM that provides a logical and comprehensive view of the enterprise, in terms that cut across commercial enterprises and industries. The Berman CBM is based upon a logical partitioning of business activities into non-overlapping managing concepts, at the three levels of management accountability: (i) providing direction to the business; (ii) controlling how the business operates; and (iii) executing the operations of the business. Berman also discloses that merger and acquisition criteria can be used to develop a heat map of components to be included in a divestiture or downsizing. Berman further discloses that a transformation plan includes transformation of technology into a new environment (often moving to a service-oriented architecture or moving data/systems onto newly agreed upon shared platforms). However, Berman does not disclose that the CBM and its associated heat map(s) are located on or implemented by the transformation technology that is planned to be moved to SOA. In other words, Berman does not disclose an approach or tooling to consume a CBM Heat Map for SOA solution development.

US patent application 2007/0038501 ("Lee") discloses a CBM and an associated heat map. Lee also discloses that the lower layers of its CBM represent IT architecture including a wide range of services implemented in IT infrastructure, such as service-oriented architecture. While the CBM of Lee, in part, represents an SOA, Lee does not disclose an approach or tooling to consume a CBM Heat Map for SOA solution development.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

Currently, there is no tooling support available to leverage a CBM Heat Map for SOA solution development. There remains a need for data integration methods and systems that permit use, reuse, and modification of functionality in a changing business environment. To facilitate such methods and systems, a need also exists for improved methods and systems for deploying data integration functions. At least some embodiments of the present invention fill one or more of these needs. The present invention is directed to converting CBM related data (see DEFINITIONS section) into a form suitable for implementation in an SOA solution development environment. More specific aspects of the present invention will now be discussed.

According to one embodiment of the present invention, seamless transition from a Component Business Model (CBM) to a Services Oriented Architecture (SOA) is achieved by a method of converting a CBM Heat Map into a format compatible for an SOA environment by converting a tabular representation of a CBM Heat Map to a Unified Modeling Language (UML) representation, and converting the UML representation of a CBM Heat Map to a first iteration of input for SOA solution development. In a further aspect of the method, the conversion to a first iteration is performed using service oriented modeling and architecture (SOMA). In a further aspect of the method, the conversion steps are performed automatically. In another aspect of the method, subsequent to converting converting the tabular representation of a CBM Heat Map to a Unified Modeling Language (UML) representation, loading the UML representation of the CBM Heat Map into a modeling tool. The modeling tool may include rational software architect or a rational software modeler.

In yet another aspect of the method, converting the tabular representation of a CBM Heat Map to a Unified Modeling Language (UML) representation includes parsing the CBM Heat Map, retrieving a plurality of CBM elements, processing the plurality of CBM elements, identifying a plurality of UML elements that respectively correspond to the plurality of CBM elements, and forming the plurality of UML elements into the UML representation of the CBM heat map.

According to another embodiment of the present invention, traceability between CBM to SOA is achieved.

According to yet another embodiment, a method of automatically converting a tabular representation of the CBM Heat Map to the UML representation includes identifying a CBM heat map, parsing the CBM heat map and retrieving CBM elements, creating a UML model corresponding to the CBM Heat Map, identifying UML elements to correspond to the CBM elements, and forming the UML elements into target model.

In still another embodiment of the invention, the UML representation of CBM elements includes Business Competency, Business Components, Business Service and Business Activity stereotypes.

In a further embodiment of the invention, a method for processing CBM related data is provided including providing CBM related data and modeling the CBM related data by a modeling language to produce a CBM model. In a further aspect of the method, the modeling step includes creating a business competency level of the CBM model, creating a business component level of the CBM model, which is hierarchically below the business competency level, and creating a business service level of the CBM model, which is hierarchically below the business component level. In yet another aspect of the method, the modeling language is UML and the CBM model is a UML model. In still a further aspect, the method includes, subsequent to the modeling step, converting the CBM model to an SOA service model. The converting step may be accomplished by the use of a tool. In a further aspect of the method, subsequent to the modeling step, the CBM model is converted to a service model. The CBM related data includes a heat map.

In a further embodiment of the invention, a method for processing CBM related data is provide including the steps of providing CBM related data, and processing the CBM related data to produce an SOA service model. The SOA service model may be a domain based SOA service model. The CBM related data includes a heat map.

In another embodiment of the invention, a system is provided including a component for automatically converting a tabular representation of a Component Business Model (CBM) to a Unified Modeling Language (UML) representation and a component for automatically converting the UML representation of a CBM Heat Map to a first iteration of input for SOA solution development. In a further aspect of the method, the conversion to a first iteration is performed using service oriented modeling and architecture (SOMA). In a further aspect, the system includes a component for converting the CBM model to an SOA service model. The CBM related data includes a heat map. In another aspect of the system, the modeling language is UML and the CBM model is a UML model.

In still another embodiment of the invention, a computer program product encoded in a computer readable medium for converting a CBM into Services Oriented Architecture environment is provided including CBM related data, one or more modeling tools for creating a CBM model from the CBM related data, and one or more modeling tools for converting the CBM model to an SOA service model. In a further aspect of the computer program product, the one or more modeling tools include rational software architect or a rational software modeler.

In another aspect, a computer program product encoded in a computer readable medium for converting a CBM Heat Map into the first iteration of input used during the subsequent SOA solution development via SOMA is provided including automatically converting a tabular representation of a Component Business Model (CBM) to a Unified Modeling Language (UML) representation of a CBM Heat Map to a first iteration of input used during the subsequent SOA solution development using SOMA.

DETAILED DESCRIPTION

Embodiments of the present invention provide a system and method for making use of the Component Business Model (CBM) approach to integrating varied business inputs to provide a view for arriving at business solutions. Service Oriented Architecture (SOA) as used herein shall include services that form part of the infrastructure of a business enterprise. In the SOA, services can become building blocks for application development and deployment, allowing rapid application development and avoiding redundant code.

Figure 1:
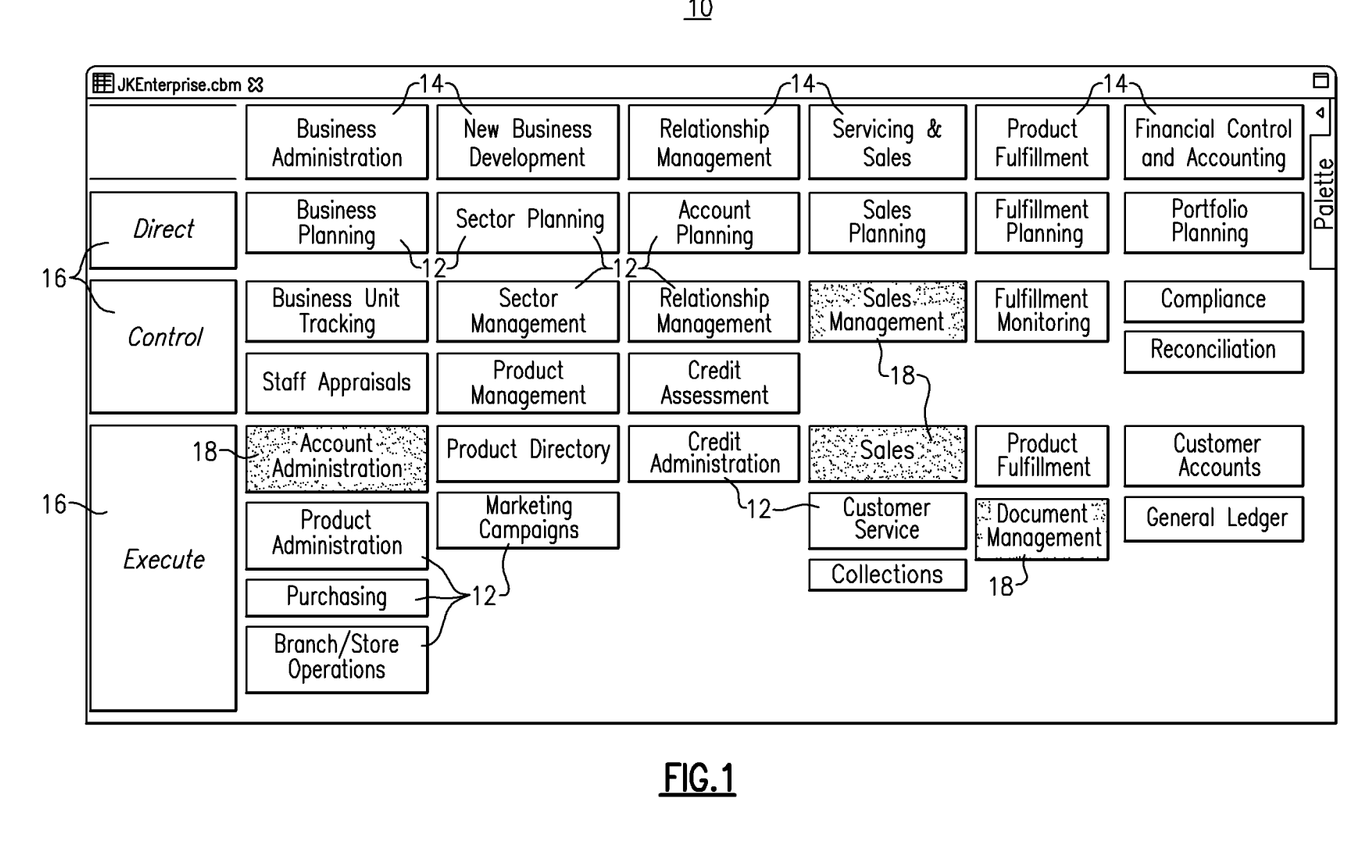
FIG. 1 shows a CBM heat map.

Reference is made to FIG. 1, which shows a CBM Heat Map 10 in tabular form. CBM Heat Map 10 is a representation of Business Components 12 grouped into major categories or called Business Competencies 14. The variable number of categories are designed to cover various types of business activity in every industry. Components 12, which are the main body of the CBM map 10 are grouped into three accountability levels 16, such as Direct, Control and Execute. The Direct level represents all those Business Components in the business that set the overall strategy and direction for the business. The Control level represents all those Business Components in the business that translate those plans into actions, in addition to managing the day-to-day running of those activities. The Execute Level contains the Business Components that actually execute the detailed activities and plans of the business.

A business component 12 is the basic building block of an organization. It is a cohesive group of business activities supported by appropriate processes, applications, infrastructure and metrics. Components are non-overlapping partitions of business activity, that is, components must have boundaries for their separate cohesive groups of business activities that are simultaneously coincident with respect to a) functional purpose, b) organizational role and authority, c) skill levels required, and d) operational and technical needs. Each component operates by calling and offering business services. The specialization and expertise of a component is encapsulated as far as possible. A component works under a managing concept, which is responsible for each instance of the component over the lifetime of the instance. Often, and preferably, a component defines a boundary with respect to other components that enables the component to be outsourced with little or no disruption of the business.

FIG. 1 shows certain components 12 being highlighted. The highlighted components 18 are "hot" components, which need immediate attention. Due to the existence of "hot" components 18, the CBM map 10 is considered a "Heat Map" (see DEFINITIONS section).

Figure 2:
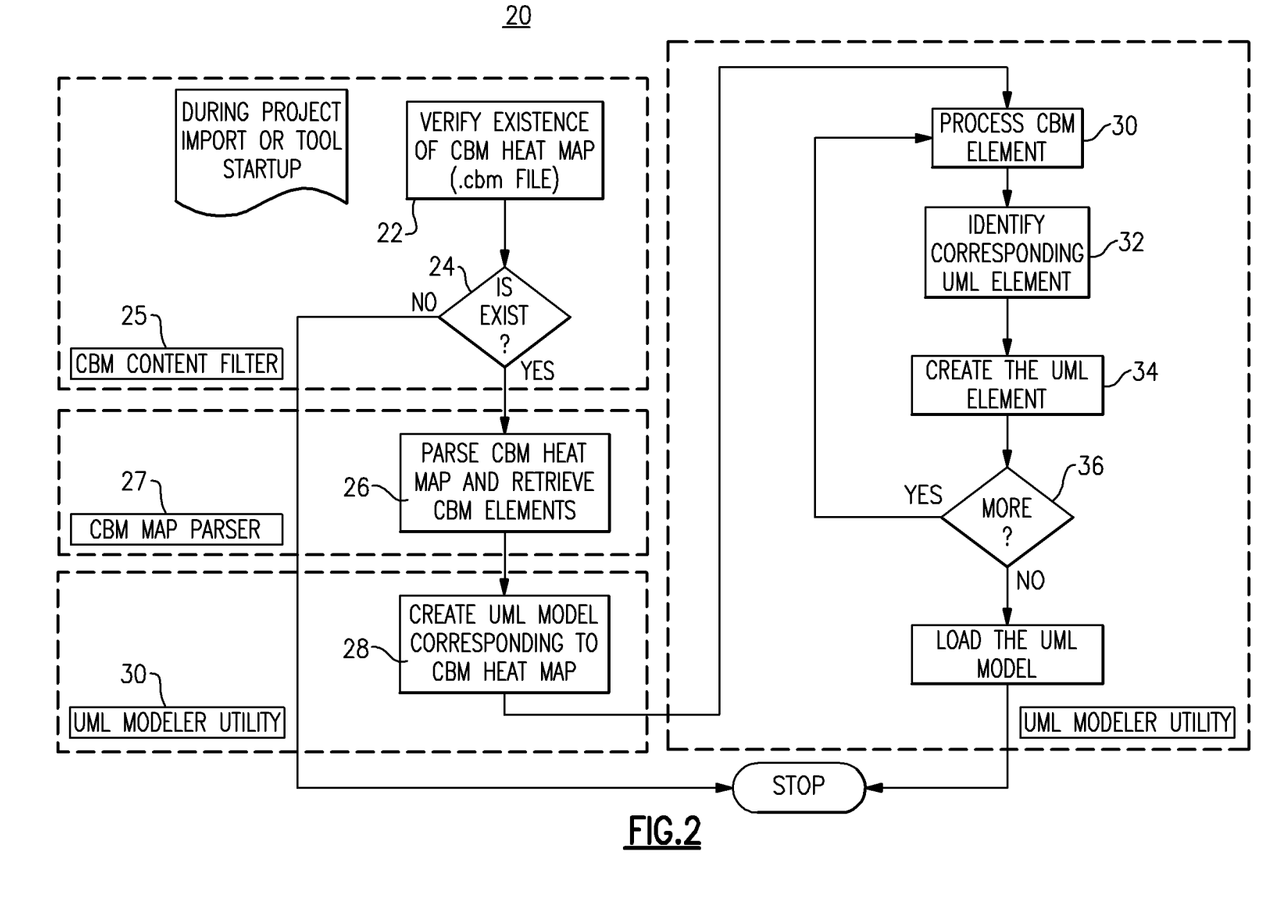
FIG. 2 shows a flow chart describing the steps for conversion of a tabular representation of a CBM Heat Map to a UML representation.

In order to convert CBM Heat Map 10 to a first iteration of input for SOA solution development using service oriented modeling and architecture (SOMA), the tabular representation of CBM Heat Map 10 is preferably first transformed into a visual model by a modeling language (see DEFINITIONS section), which is preferably the Universal Modeling Language (UML). FIG. 2 is directed to one embodiment of a process 20 for converting CBM Heat Map 10 into a UML representation. Initially, at step 22, the existence of a CBM heat map must be verified. If a heat map does exist at step 24, the process continues at step 26. Steps 22 and 24 are performed by a component called a CBM Content Filter 25. Logic to identify CBM Heat Map 10 is implemented in CBM Content Filter component 25. CBM Content Filter 25 hides CBM files in the Project Explorer and triggers a CBM Parser Component 27.

At step 26, CBM Heat Map 10 is parsed and CBM elements are retrieved. This step is handled by the CBM Map Parser component 27. This component preferably uses custom eXtensible Markup Language (XML) parsing to retrieve Business Competencies, Business Components, Business Services, and Business Activities from CBM Heat Map 10. Parser component 27 uses logic to detect "hot" components 18. Parser Component 27 captures implied hierarchy of the input text and transforms it into a form that is suitable for SOA solution development. This parser supports CBM Heat Maps created using software such as, but not limited to, IBM CBM Tool versions 1.6, 1.6.1, 2.0, 2.1 and 2.2.

Once the CBM elements are retrieved by the Parser Component 27 a UML Model corresponding to CBM Heat Map 10 is created at step 28 by a Custom UML Modeler Utility 30. The Custom UML Modeler Utility creates UML elements that correspond to the CBM elements retrieved from the CBM Heat Map 10. The creation of the UML representation includes step 30, wherein each CBM element is processed. At step 32, a UML element that corresponds to the CBM element is identified. Next, at step 34, the UML element is created. The process continues at step 36 if more CBM elements require conversion to UML, and the process is repeated at steps 30 through 34 until all retrieved CBM elements have been converted to UML elements. When no more elements are left for conversion, the UML model is loaded into a Rational Software Architect/Rational Software Modeler (RSA/RSM). The Custom UML Modeler Utility 30 creates the relationship between the business component and the business process in a UML way.

Figure 3:
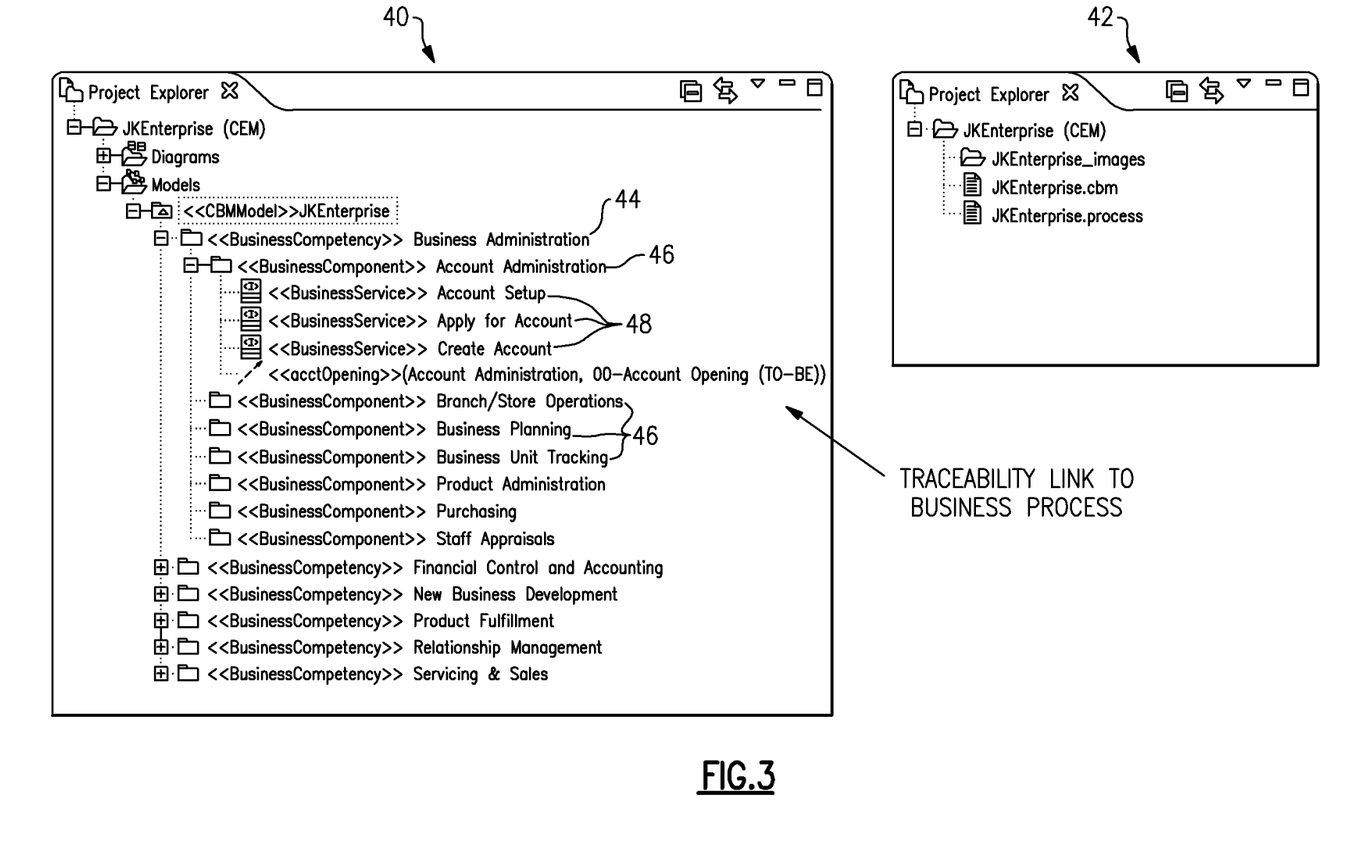
FIG. 3 is a comparison of representations of a CBM heat map in SOA solution modeling tools.

FIG. 3 is a comparison of a representation of a CBM heat map 40 in UML based SOA modeling tools according to an embodiment of the present invention and a representation of a CBM heat map 42, which does not implement any of the embodiments of the invention. CBM heat map 40 is represented using a UML profile that has been created in accordance herein. As shown in heat map representation 40, the UML profile shows a hierarchical view of the following: (i) business competencies 44 (at the first level of the hierarchy); (ii) Business Components 46 (at the second level of the hierarchy); and (iii) Business Services 48 and Business Activities (at the third level of the hierarchy). This Hot meta-attribute on Business Component stereotype will differentiae hot components from the test. As shown in FIG. 3 there is a traceability link from business component to a business process in UML representation 40, which cannot be provided for in representation 42 because conventional heat map 42 can not be represented in a modeling language prior hereto.

Business competencies 14 from heat map 10 in FIG. 1 are represented as a UML package with Business Competency stereotype 44 of a CBM profile. Business components 12 from heat map 10 in FIG. 1 are represented as a UML package with Business Components stereotype 46 of a CBM profile applied. Business services are represented as a UML interface with Business Services stereotype 48 of a CBM profile applied. Business Activities are represented as a UML interface with a Business Activity of a CBM profile applied.

Figure 4:
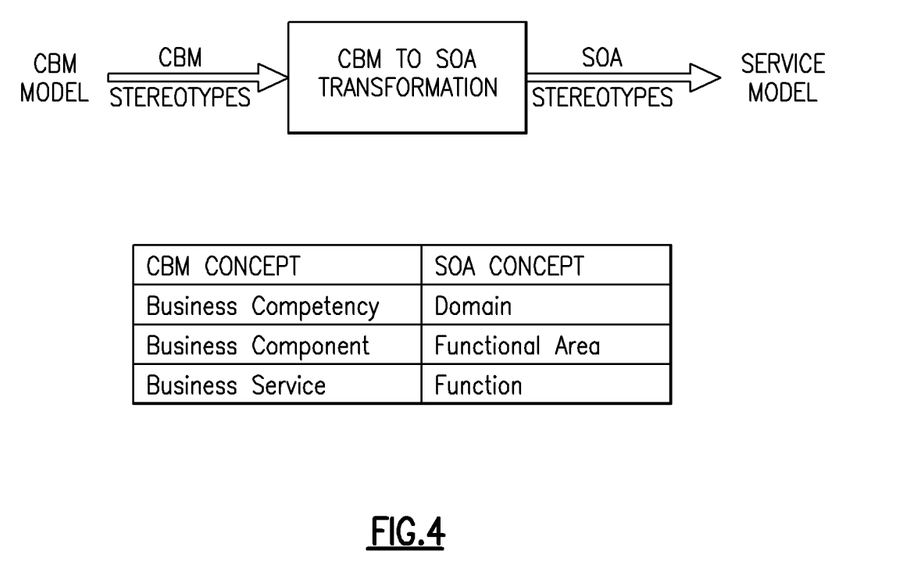
FIG. 4 shows transformation mapping between CBM Heat Map elements and corresponding SOA model elements.

The conversion of the tabular representation of CBM heat map to a UML representation allows access by SOA modeling tools, which is highly advantageous. FIG. 4 shows the transformation of the UML representation of CBM Heat Map 42 to a service model (see DEFINITIONS section). More specifically, the SOA of FIG. 4 is a domain based SOA (see DEFINITIONS section), and the SOA service model is a domain based SOA service model (see DEFINITIONS section). As shown in FIG. 4: (i) the business competencies of the CBM heat map are transformed into domains; (ii) the business components of the CBM heat map are transformed into functional areas; and (iii) the business activities are transformed into functions. The intermediate conversion of the original CBM related data and associated heat map into a UML representation is helpful to populate the first iteration of input used during the subsequent SOA solution development using SOMA. Although the UML CBM model of FIG. 3 and the SOA service model of FIG. 4 each have three hierarchical levels below the enterprise level, some CBM models, now known, or to be developed in the future, may have additional hierarchical levels.

Additional user interfaces for downstream activities may include, but are not limited to, service oriented modeling and architecture (SOMA) for creation of fine-grained functional areas from coarse-grained functional areas; for the creation of subsystems from functional areas; for the creation of candidate services from functions; and for the creation of candidate service references.

Figure 5:
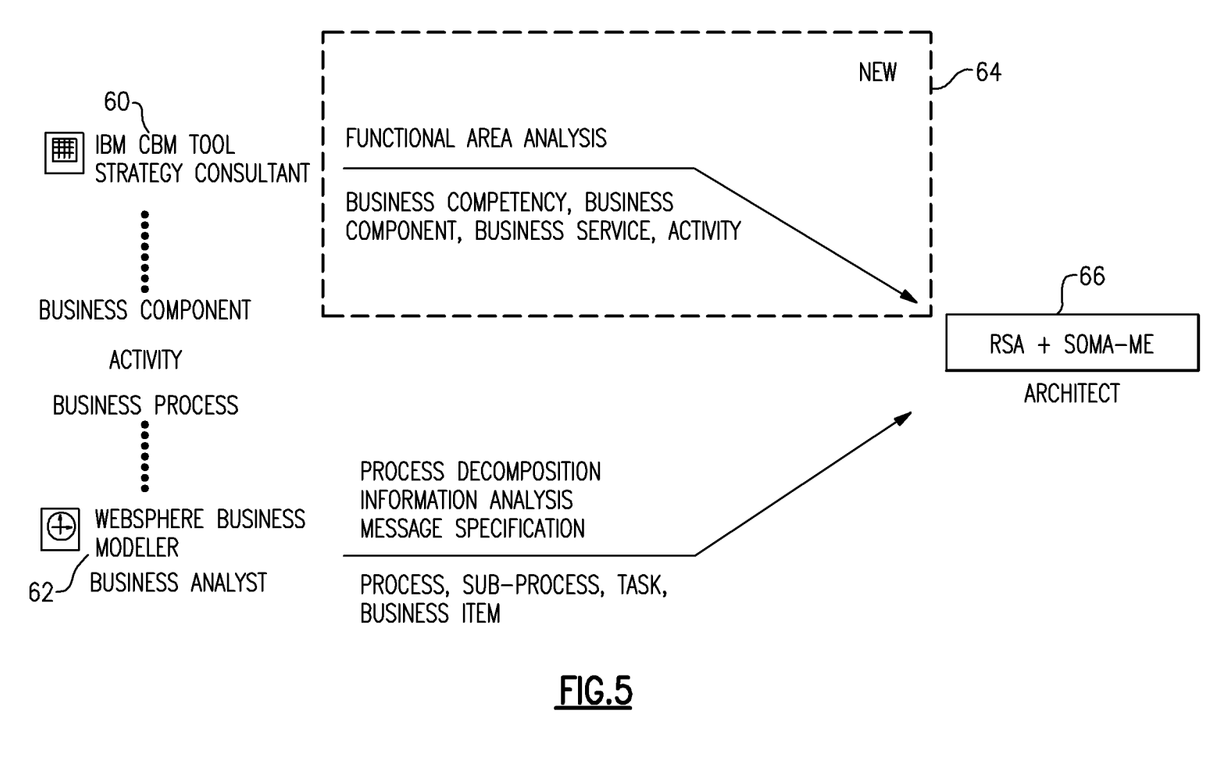
FIG. 5 shows tools used in the process of converting a CBM Heat Map to a first iteration of input for SOA solution development using SOMA.

FIG. 5 shows tools for use with the conversion of a CBM to a SOA model. The CBM heat map is one of the major deliverables of a CBM and can be used as an input for the identification phase of SOMA. Functional area analysis, a service identification technique of SOMA is aimed to partition and decompose the scope of the business or project. When CBM engagement is complete, the CBM Heat Map can be used as an initial input for Functional Area Analysis. Business competencies containing hot components in a CBM map can be considered as Domains in SOMA. Business Components that are marked as hot in a CBM map can be considered as Functional Areas in SOMA. Business Activities of hot components in a CBM map can be considered as Functions, also known as Business Capabilities in SOMA. Functional Areas can be used to group functionally related services and define potential subsystem boundaries used for service component identification. Functions can be used to map business capabilities to candidate services.

FIG. 5 shows how an IBM CBM Tool 60 can be used to create a CBM heat map. A Websphere Business Modeler tool 62 is used to model business processes. Traceability links 64 between Functional Area Analysis elements and CBM elements in the modeling tools 66, which enable SOA to be used herein.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

Service Oriented Architecture (SOA): any business process server where at least some of the business processes are packaged as services and at least some of the services communicate with each other; preferably under SOA, the business process server defines and provisions IT infrastructure to allow different applications to exchange data and participate in business processes; SOA is not necessarily limited with respect to: (i) programming language(s); (ii) degree of interoperability; (iii) communication protocol(s); (iv) degree of integration between application(s); (v) use of messages; (vi) level of complexity; (vii) use of web services; (viii) hardware/software structure of the process server and/or (ix) geographic and/or hardware distribution of the process server.

Services: intrinsically unassociated units of functionality, which have no calls to each other embedded in them; services usually implement functionalities most people would recognize as a "service" in the colloquial sense of that word, such as filling out an online application for an account, viewing an online bank statement, or placing an online booking or airline ticket order.

Component Business Model (CBM): a model of a business including a plurality of non-overlapping business components representing a target state of the business, with each component being a group of cohesive business activities; preferably, the CBM includes the following elements: (i) Business Components element; (ii) Business Competency element; and/or (iii) Business Service element and/or (iv) Business Activity element; preferably, the CBM includes a heat map.

Heat map: a set of data identifying at least one critical business component(s) in a CBM, without regard to: (i) whether the heat map assigns a priority value to all components; (ii) the number of possible priority values used in the heat map; and/or (iii) the criteria and/or manner by which critical components are selected.

CBM related data: any data that forms at least a part of a CBM; CBM related data may constitute or include a heat map.

Modeling Language: any standardized visual specification language for object modeling by software engineers that includes a graphical notation used to create an abstract model of a system, referred to as a model; UML is one example of a modeling language.

CBM model: any model representing any CBM related data in a hierarchical structure including a plurality of hierarchical levels; CBM models include, but are not limited to UML models and SOA service models.

SOA service model: any CBM model suitable for use in an SOA environment.

Domain based SOA: any SOA that includes an organization hierarchy including at least the following levels (sometimes referred to as SOA concepts): (i) domain; (ii) functional area; and (iii) function.

Domain based Service model: any CBM model suitable for use in an SOA environment.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A method of consuming a Component Business Model (CBM) Heat Map for Services Oriented Architecture (SOA) based solution development, the method comprising the steps of:
   identifying a CBM Heat Map;
   at a first converting step, automatically converting the tabular representation of the CBM Heat Map to a Unified Modeling Language (UML) representation; and
   subsequent to the first converting step, at a second converting step, converting the UML representation of the CBM Heat Map to a first iteration of input for SOA solution development;
   wherein the first converting step comprises the steps of: (i) retrieving a plurality of CBM elements; (ii) processing the plurality of CBM elements; (iii) identifying a plurality of UML elements that respectively correspond to the plurality of CBM elements; and (iv) forming the plurality of UML elements into the UML representation of the CBM heat map.

2. The method of claim 1 wherein the second converting step is performed using service oriented modeling and architecture (SOMA).

3. The method of claim 1 wherein the second converting step is performed automatically.

4. The method of claim 1 further comprising the step of:
   subsequent to the first converting step, loading the UML representation of the CBM heat map into a modeling tool.

5. The method of claim 4 wherein the modeling tool comprises at least one of the following tool components: rational software architect or rational software modeler.

6. The method of claim 1 wherein the UML representation of the CBM heat map comprises: Business Competency, Business Component, Business Activity, and Business Services.

7. A method for processing Component Business Model (CBM) related data, the process comprising the following steps:
   providing CBM related data comprising a heat map;
   modeling the CBM related data by Unified Modeling Language (UML) to produce a CBM model; and
   automatically converting the CBM model to a Services Oriented Architecture (SOA) service model;
   wherein the converting step comprises the steps of: (i) retrieving a plurality of CBM elements; (ii) processing the plurality of CBM elements; (iii) identifying a plurality of UML elements that respectively correspond to the plurality of CBM elements; and (iv) forming the plurality of UML elements into the UML representation of the heat map.

8. The method of claim 7 wherein modeling step comprises the following sub-steps:
   creating a business competency level of the CBM model;
   creating a business component level of the CBM model, which is hierarchically below the business competency level; and
   creating a business service level of the CBM model, which is hierarchically below the business component level.

9. The method of claim 7 wherein the converting step is accomplished by the use of a tool.

10. A method for processing Component Business Model (CBM) related data, the process comprising the following steps:
    providing CBM related data comprising a heat map;
    at a first converting step, automatically converting the CBM related data to a Unified Modeling Language (UML) representation; and
    subsequent to the first converting step, at a second converting step, converting the UML representation of the CBM related data to a Services Oriented Architecture (SOA) service model;
    wherein the first converting step comprises the steps of: (i) retrieving a plurality of CBM elements; (ii) processing the plurality of CBM elements; (iii) identifying a plurality of UML elements that respectively correspond to the plurality of CBM elements; and (iv) forming the plurality of UML elements into the UML representation of the CBM related data.

11. The method of claim 10 wherein the SOA service model is a domain based SOA service model.

12. A system for converting a component business model into services oriented architecture environment comprising:
    a processor comprising a non-transitory storage medium;
    a component for a providing Component Business Model (CBM) related data comprising a heat map;

a component for processing, using the processor, the CBM related data by a modeling language to produce a CBM model, wherein said component for processing is adapted to, at a first converting step, automatically convert the CBM related data to a modeling language representation, and further wherein said component for processing is adapted to, subsequent to the first converting step, convert the modeling language representation of the CBM related data to a CBM model;

wherein the first converting step comprises: (i) retrieving a plurality of CBM elements; (ii) processing the plurality of CBM elements; (iii) identifying a plurality of modeling language elements that respectively correspond to the plurality of CBM elements; and (iv) forming the plurality of modeling language elements into the modeling language representation of the CBM related data.

13. The system of claim 12 further comprising:
a component for converting the CBM model to an SOA service model.

14. The system of claim 12 wherein the modeling language is UML and wherein the CBM model is a UML model.

15. A computer program product encoded in a non-transitory computer readable medium for converting a Component Business Model (CBM) into Services Oriented Architecture (SOA) environment comprising:

CBM related data comprising a heat map;

one or more modeling tools for creating a CBM model from the CBM related data using a modeling language, wherein said one or more modeling tools are configured to, at a first converting step, automatically convert the CMB related data to a modeling language representation, and are further configured to, at a second converting step subsequent to the first converting step, convert the modeling language representation to a CBM model; and one or more modeling tools for converting the CBM model to an SOA service model;

wherein the first converting step comprises the following sub-steps: (i) retrieving a plurality of CBM elements; (ii) processing the plurality of CBM elements; (iii) identifying a plurality of modeling language elements that respectively correspond to the plurality of CBM elements; and (iv) forming the plurality of modeling language elements into the modeling language representation of the CBM related data.

16. The computer program product of claim 15 wherein the one or more modeling tools comprise rational software architect or a rational software modeler.

* * * * *